United States Patent [19]

Tokuyama et al.

[11] Patent Number: 4,700,303

[45] Date of Patent: Oct. 13, 1987

[54] HEIGHT ADJUSTING APPARATUS FOR MOTOR VEHICLE

[75] Inventors: Keiichi Tokuyama; Mitsuhiro Masuda; Osamu Igarashi, all of Katsuta; Taiji Hasegawa, Nakaminato, all of Japan

[73] Assignee: Hitachi, Ltd., Tokyo, Japan

[21] Appl. No.: 724,833

[22] Filed: Apr. 19, 1985

[30] Foreign Application Priority Data

Apr. 20, 1984 [JP] Japan .................................. 59-78504

[51] Int. Cl.⁴ ............................................ B60G 17/00
[52] U.S. Cl. .................................... 364/424; 371/16; 280/707; 280/DIG. 1
[58] Field of Search ............... 364/424, 425, 550, 551, 364/562; 371/16, 62; 340/52 R, 52 F; 280/6 R, 6.1, 707, 714, DIG. 1; 180/41

[56] References Cited

U.S. PATENT DOCUMENTS

| | | |
|---|---|---|
| 4,168,840 | 9/1979 | Graham .............................. 280/6 R |
| 4,185,845 | 1/1980 | Misch et al. ................... 280/DIG. 1 |
| 4,304,003 | 12/1981 | Kakizawa et al. ..................... 371/62 |
| 4,349,077 | 9/1982 | Sekiguchi et al. ..................... 180/41 |
| 4,401,310 | 8/1983 | Ishikawa et al. ...................... 280/6.1 |
| 4,483,546 | 11/1984 | Brearley ........................ 280/DIG. 1 |
| 4,541,050 | 9/1985 | Honda et al. .......................... 371/62 |
| 4,568,096 | 2/1986 | Yew et al. ............................. 280/6.1 |

Primary Examiner—Gary Chin
Attorney, Agent, or Firm—Antonelli, Terry & Wands

[57] ABSTRACT

An apparatus for adjusting height of a motor vehicle have functions of detecting abnormality of sensors for detecting the vehicle height, driving a compressor independent of outputs of the sensors when pressure within a suspension is lower than a predetermined value, enabling actuation of the compressor after lapse of a predetermined time since turning-on of an ignition switch, enabling decreasing of the vehicle height for a predetermined time after turning-off of the ignition switch, and a self-diagnosing function for preventing runaway of the control.

6 Claims, 6 Drawing Figures

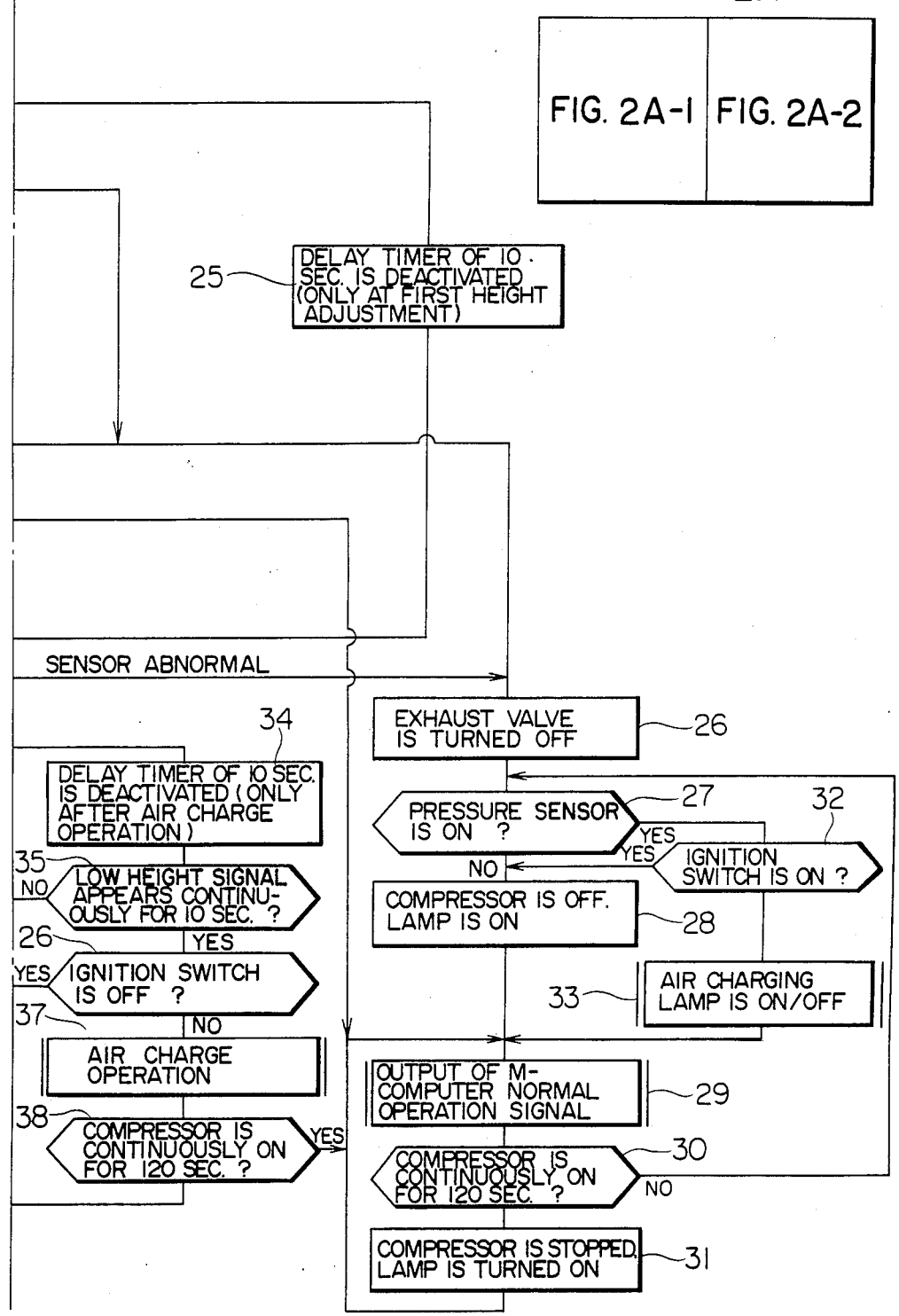

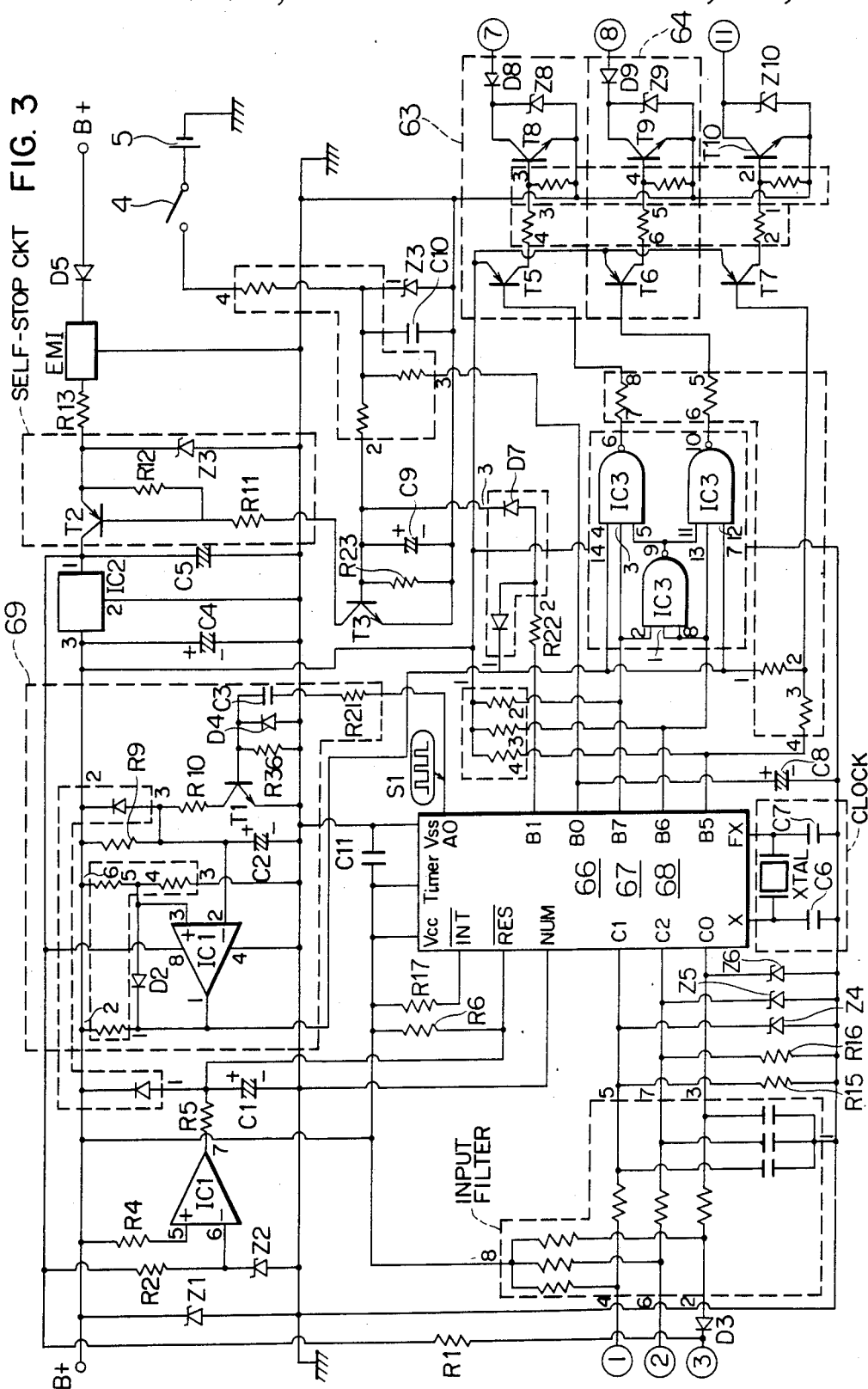

HEIGHT ADJUSTING APPARATUS FOR MOTOR VEHICLE

BACKGROUND OF THE INVENTION

The present invention relates to an apparatus for adjusting or regulating height of a motor vehicle.

The suspension of a motor vehicle has a spring constant of a predetermined value. The body of the vehicle is therefore lowered in dependence on load. For example, when a load applied to a passenger car is localized to a trunk room or rear seat thereof, the front portion of the vehicle body carrying front wheels is lifted while the rear portion is lowered, resulting in inclination of the vehicle body. In the inclined state of the vehicle, driving performance (e.g. stability of the vehicle upon manipulation of a steering wheel) is degraded. Besides, light beams projected by headlights will be deviated from the statutory direction, to place the vehicle in dangerous state. Technology for controlling the posture of a vehicle is disclosed, for example, in Japanese Patent Application Laid-Open No. 6786/1979.

SUMMARY OF THE INVENTION

It is an object of the present invention to provide an apparatus for adjusting height of a motor vehicle to thereby maintain the body of vehicle in a predetermined posture irrespective of the loaded state thereof.

In view of the above object, there is proposed according to an aspect of the invention a control apparatus for maintaining the vehicle in a predetermined posture (e.g. horizontal state) by discharging air from an air suspension of the vehicle when the height of vehicle is greater than a predetermined position while charging the suspension with air through a compressor when the vehicle height is lower than the predetermined position, the control apparatus being further imparted with various functions mentioned below in connection with the above control.

(1) Function of detecting abnormality of sensors employed for detecting the vehicle height.
(2) Function of driving the compressor only for a predetermined time.
(3) Function of driving the compressor independent of the outputs of the sensors in case the pressure within the suspension is lowered below a predetermined level.
(4) Function of enabling the activation of the compressor after lapse of a predetermined time since turning-on of an ignition switch.
(5) Function of allowing the vehicle height to be lowered for a predetermined time even after the ignition switch is turned off.
(6) A self-diagnosing function for preventing runaway of the controller.

BRIEF DESCRIPTION OF THE DRAWINGS

The above and other objects, features and advantages of the present invention will be more apparent from the following description made with reference to the accompanying drawings, in which:

FIGS. 2A, 2A-1, 2A-2 and 2B show flow charts for illustrating operation of the apparatus shown in FIG. 1; and FIG. 3 is a circuit diagram showing in detail a circuit configuration of the apparatus shown in FIG. 1.

DESCRIPTION OF THE PREFERRED EMBODIMENTS

In the following, the present invention will be described in detail in conjunction with exemplary embodiments thereof by referring to the accompanying drawings.

Figure 1:
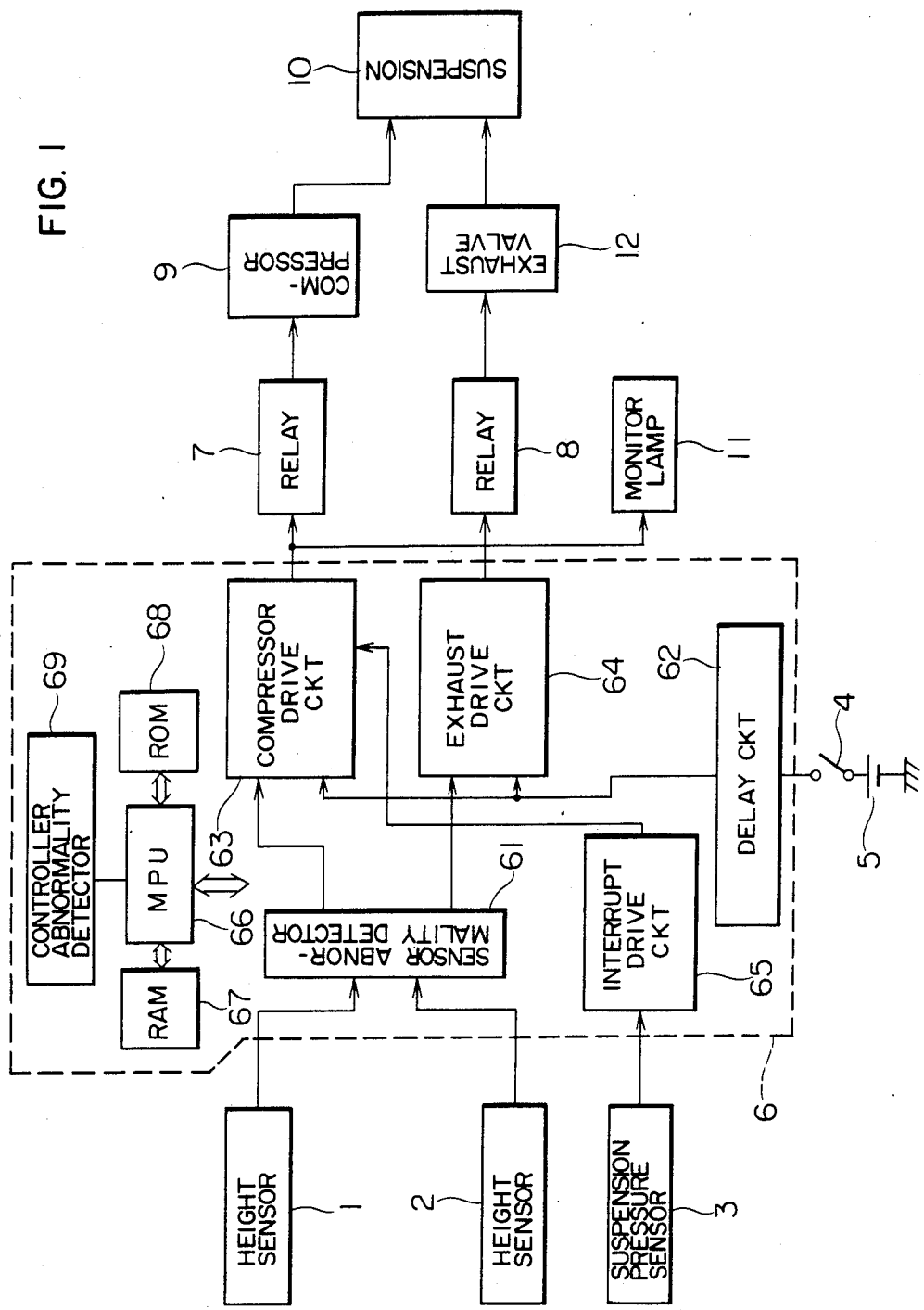
FIG. 1 is a block circuit diagram showing a general arrangement of the apparatus according to an exemplary embodiment of the present invention.

FIG. 1 is a block diagram showing a general arrangement of the apparatus according to an embodiment of the invention.

Referring to the figure, the illustrated system includes a pair of vehicle height sensors 1 and 2, a suspension pressure sensor 3, an ignition switch 4, a DC supply source 5, a main controller 6, relays 7 and 8, a compressor 9, an air suspension 10 and a monitor lamp 11.

The vehicle height sensor 1 serves to detect whether the actual vehicle height exceeds a predetermined reference height and may be constituted by a sensor known in the art. When the actual vehicle height is greater than the reference height or level, the sensor 1 produces a logic "0" signal as the output and otherwise produces a logic "1" signal.

On the other hand, the vehicle height sensor 2 serves to detect if the actual height of the vehicle is below the predetermined reference height and may be constituted by a known sensor. When the vehicle height is below the reference level, the sensor 2 produces an output signal of logic "0" and otherwise produces logic "1".

The suspension pressure sensor 3 functions to detect directly the pressure within the air suspension 10 and actuates the compressor 9 when the pressure detected is low regardless of the logic levels of the output signals produced by the vehicle height sensors 1 and 2.

The ignition switch 4 is interlocked with a key switch of the motor vehicle in the manner known per se. The DC power supply 5 may be constituted, for example, by a battery.

The main controller 6 includes a micro-computer unit (MPU) 66, a RAM (random access memory) 67 and a ROM (read-only memory) 68 and performs controls in such manner that the relay 7 or 8 is electrically energized in response to the output signals of the height sensors 1 or 2 applied to the controller 6 to thereby actuate the compressor 9 to increase the pressure within the air suspension 10 for increasing the vehicle height or alternatively to discharge (exhaust) the air from the suspension 10 to thereby decrease the vehicle height.

The main controller 6 further incorporates a sensor abnormality detecting circuit 61, a delay circuit 62, a compressor drive circuit 63, an exhaust drive circuit 64, an interrupt drive circuit 65 and a controller abnormality detecting circuit 69.

The sensor abnormality detecting circuit 61 may be constituted, for example, by a gate circuit and serves to block the gate function when the output signals of both the sensors 1 and 2 are logic "0", indicating a failure or abnormality such as breakage of a wire. If otherwise, i.e. when the output signal of either the sensor 1 or 2 is logic "1", the sensor abnormality detecting circuit 61 allows the succeeding circuits to be driven.

More specifically, when the output signal of the sensor 2 is logic "1", the compressor drive circuit 63 is driven to energize the relay 7, whereby the compressor 9 is actuated, resulting in that the air suspension 10 is supplied or charged with air.

In this conjunction, it is to be noted that compressor drive circuit 63 is usually so designed as to operate the compressor 9 for a short time (e.g. 120 seconds) to thereby protect the compressor 9 from burning which would occurs if it is operated for an extended time duration, since the compressor 9 is usually rated for a short time operation. To this end, the compressor drive circuit 63 incorporates a timer which serves to stop the operation of the compressor 9 after lapse of a predetermined time (e.g. 120 seconds) since activation of the compressor 9.

To inform the operator or driver of the running of the compressor 9, the output signal of the compressor drive circuit 63 is also utilized for lighting the monitor lamp 11.

When the output signal of the sensor 1 is logic "1", the exhaust drive circuit 64 is driven to energize the relay 8 to thereby open an exhaust valve 12 of the air suspension 10, as the result of which air is discharged from the suspension 10.

The delay circuit 62 serves to delay the activation of the compressor 9. More concretely, if the compressor 9 is activated immediately in succession to the turning-on of the ignition switch 4, noise generated by the compressor will be offensive to the ear. In contrast, when the compressor is activated after the starting of the internal combusion engine, noise of the compressor will be concealed by noise generated by the engine, giving less offense to the ear. For this reason, the delay circuit 62 is employed for delaying correspondingly the activation of the drive circuits 63 and 64 on the assumption that a delay of 10 seconds, for example, will intervene between the turning-on of the ignition switch 4 and the running of the engine. Alternatively, in place of using the delay circuit 62, it is also possible to control the activation of the drive circuits 63 and 64 in dependence on detection of the start of engine operation or detection of the number of engine revolution.

It should further be mentioned that when the passenger gets off or goods are unloaded from the vehicle after the ignition switch is turned off, the vehicle body may possibly become inclined. To avoid such unwanted situation, it is necessary to maintain the control function for a predetermined time even after the turning-off of the ignition switch 4. The delay circuit 62 also serves for this purpose. In this case, it is however unnecessary to increase the vehicle height. Accordingly, arrangement may be made such that the delay circuit 62 acts on only the exhaust drive circuit 64.

Turning back to FIG. 1, when the suspension pressure sensor 3 provides an output in response to an abnormal drop in the pressure within the air suspension 10, the interrupt drive circuit 65 becomes operative to signal the compressor drive circuit 63 of the prevailing situation for thereby operating the compressor 9 irrespective of the logical states of the output signals of the sensors 1 and 2 until the suspension pressure sensor 3 no longer provides an output.

More specifically, if the height of the car body is abnormally decreased, the bottom portion of the vehicle which continues to run in this state may be subjected to damage or injury due to contact with the ground particularly when the road is rought. To protect the vehicle from such undesirable situation, two sensor channels (i.e. the sensors 2 and 3) are provided for detecting the low state or posture of the vehicle.

Further, the main controller 6 is imparted with a self-diagnosing function or capability. More particularly, external noise or the like influence factor may bring about the runaway of the control, involving erroneous operations. In that case, the main controller 6 should stop its functions for preventing the erroenous operation. In this connection, arrangement is made such that an abnormality alarm is generated and the engine can not be started unless the ignition switch is operated again. More specifically, the controller abnormality detecting circuit 69 is provided for detecting pulses generated by the MPU 66 in the course of normal operation thereof, wherein the alarm indicative of abnormality of the controller 6 is produced unless generation of the pulse is detected.

Figures 1, 2A:
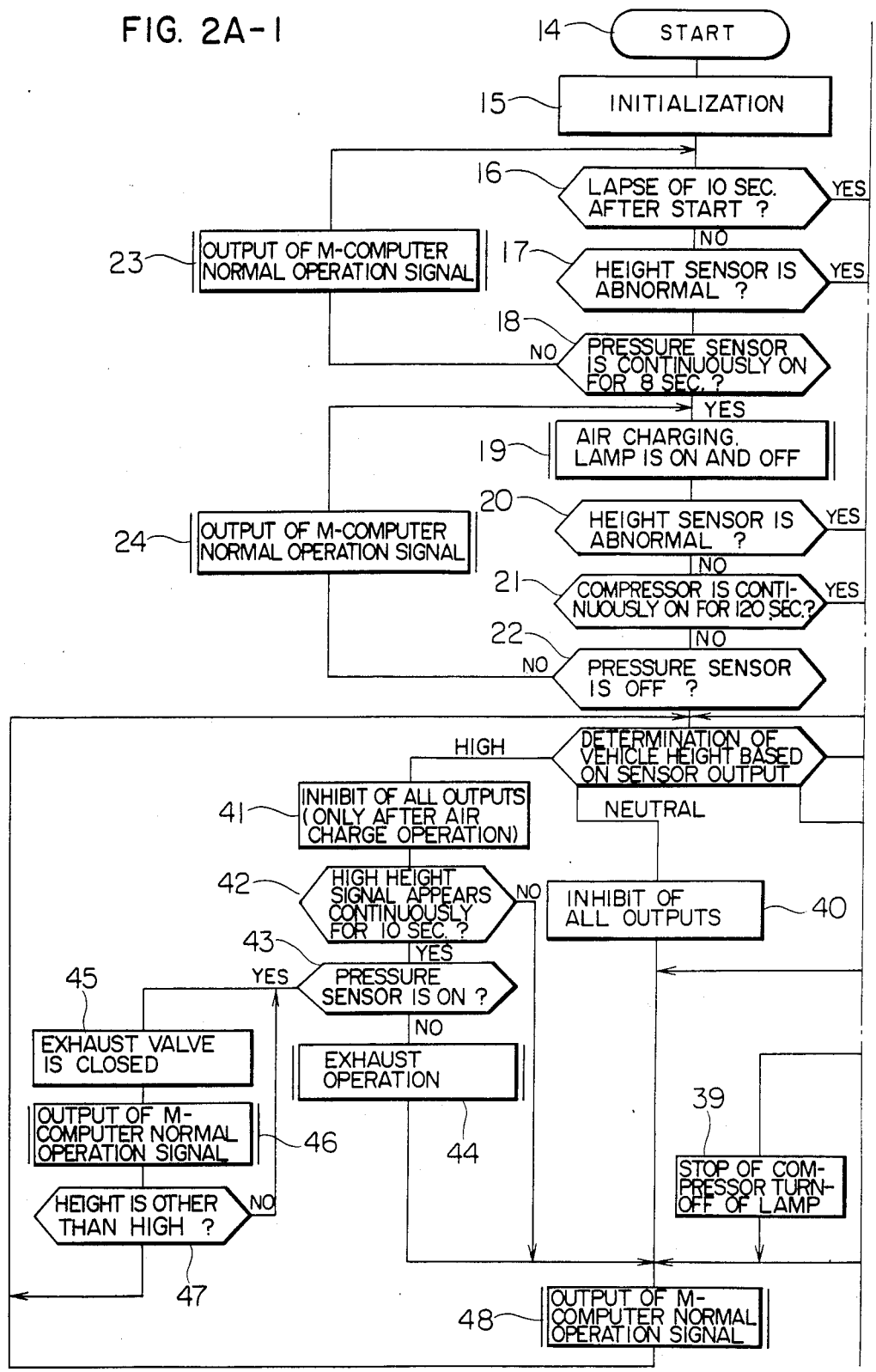
Figure 2B:
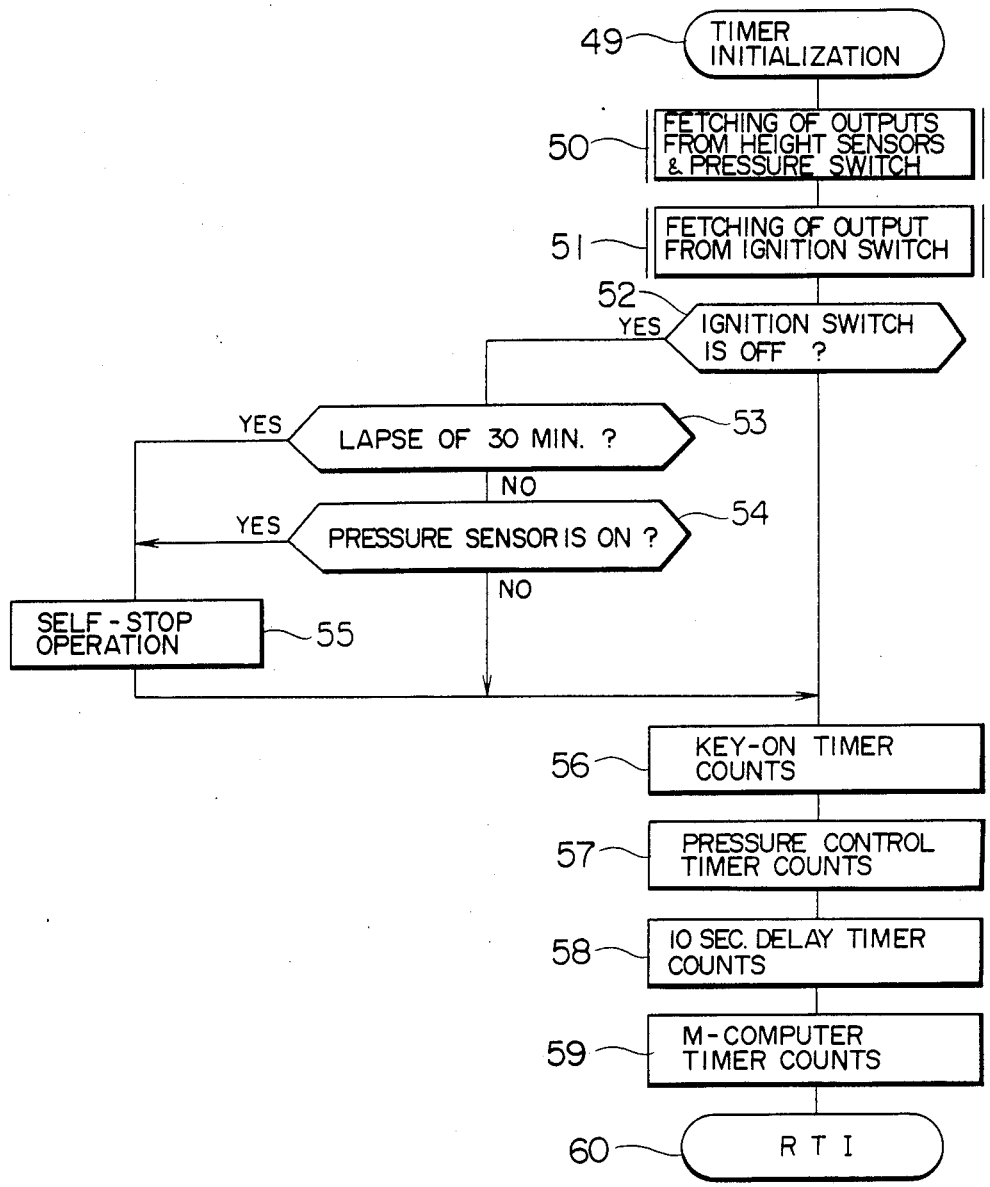

Operation of the apparatus described above is illustrated in the flow chart shown in FIG. 2.

At the start step 14 of the main routine (A), the ignition switch 4 is turned on, which is followed by an intialization step 15. Subsequently, steps 16 and 25 are executed in conjunction with the operation of the delay circuit 62. Through steps 17 to 22, the decision as to sensor abnormality and the vehicle height is executed by the main controller.

In case the vehicle height sensors 1 or 2 are determined to be abnormal (step 20), the alarming output signal is produced to light the alarm lamp and/or generate a corresponding sound alarm.

The self-diagnosing function of the main controller is executed at steps 23, 24, 29, 46 and 48. The timing at which these steps are executed is determined by counting the interrupt processings which are performed every predetermined time through an interrupt routine B including steps 49 to 60. At the step 49 shown in FIG. 2, the interrupt routine B is started in response to an interrupt request signal produced periodically at a predetermined time interval (e.g. 10 μS). At the step 60 (RTI), the interrupt routine comes to an end and the main routine A is regained.

FIG. 3 shows in detail a circuit configuration of the apparatus. The micro-computer (MPU) incorporated in the main controller 6 is provided with a terminal B7 for a signal for energizing the compressor relay 7, a terminal B6 for a signal for energizing the exhaust relay 8, and a terminal B5 for a signal for energizing the monitor lamp 11. These signals appearing at the terminals B7, B6 and B5 are adapted to drive associated switching transistors T8, T9 and T10, respectively.

At a terminal B0, there is produced a signal for maintaining the control for a predetermined time after the ignition switch 4 is turned off. Due to this signal, transistors T2 and T3 are maintained in the conducting state even after the turn-off of the ignition switch 4, whereby the micro-computer MPU can continue to perform operation.

After lapse of the predetermined time, the output signal at the terminal B0 disappears, resulting in that the transistors T2 and T3 become non-conductive. Thus, the micro-computer MPU stops operation because no current is then supplied thereto.

The pulse signal S1 indicative of the normal operating state of the micro-computer described hereinbefore is produced at a terminal A0. More particularly, so long as the operation of the microcomputer is normal, the pulse signal S1 is periodically produced at a predetermined time interval.

In response to this pulse signal, the transistor T1 is repetitionally turned on and off, to discharge a capacitor C2, as the result of which the voltage appearing across the capacitor C2 is prevented from increasing beyond a predetermined value. However, when the runaway of the control performed by the micro-computer MPU takes place, the pulse signal mentioned above is not produced. As the consequence, the potential at the capacitor C2 is increased, resulting in that the output of an operational amplifier IC1 becomes logic "0". Once the output of the operational amplifier IC1 becomes "0", the voltage at the non-inverting input terminal of the operational amplifier IC1 is lowered through a diode D2, whereby the output level of the operational amplifier IC1 is prevented from becoming logic "1" even when the voltage appearing across the capacitor C2 is again lowered.

In the state in which the output level of the operational amplifier is logic "0", the output of an operational amplifier IC3 is logic "1", rendering transistors T8 and T9 non-conductive. As the consequence, the associated relays 7 and 8 are deenergized. At that time, the transistors T7 and T10 are in the conducting state. Thus, the alarm lamp (not shown) is lit.

As will be appreciated from the foregoing description, the invention provides a vehicle height adjusting apparatus for a motor vehicle which can exhibit advantageous effects and actions as follows:

(1) Since the compressor is inhibited from operation unless the engine is started, noise offensive to the ear can be suppressed.
(2) Abnormality of the vehicle height sensors can be immediately detected and at the same time the vehicle height is prevented from decreasing abnormally even when the vehicle height sensor suffers an abnormality.
(3) The compressor rated for a short-time operation can be effectively actuated without being accompanied by burning.
(4) The control operation can be maintained for a predetermined time even after the ignition switch has been turned off.
(5) The controller is imparted with a self-diagnosing function for preventing abnormal operation.

The present invention is not restricted to the embodiments disclosed herein but many modifications and variations may occur to those skilled in the art without departing from the spirit and scope of the invention as defined by the appended claims.

What is claimed is:

1. An apparatus for adjusting height of a motor vehicle, including a first vehicle height sensor for detecting that the vehicle height becomes higher than a predetermined reference level, a second vehicle height sensor for detecting that the vehicle height becomes lower than said reference level, and a controller for exhausting air from a suspension of the vehicle in dependence on the output signal of said first vehicle height sensor or driving a compressor in dependence on the output signal of said second vehicle height sensor to supply air to said suspension for thereby maintaining the vehicle height at the predetermined reference position, comprising further a suspension presssure sensor means for detecting the pressure of said suspension and for providing an output when the detected pressure is lower than a predetermined value, wherein said controller includes at least a micro-computer; sensor abnormality detecting means for detecting an abnormality of said first and second sensors; compressor driving means for driving said compressor for a predetermined time in dependence on the output signal of said second vehicle height sensor while driving said compressor independently of the output signals of said first and second vehicle height sensors when said pressure sensor means detects that the pressure of said suspension is lower than said predetermined value; delay means for enabling activation of said compressor after lapse of a predetermined time from a time point at which an ignition switch of said motor vehicle is turned on while maintaining effective said exhaust function for said suspension until a predetermined time has elapsed from a time point at which said ignition switch is turned off; and self-diagnosing means for diagnosing operation of said controller to stop operation of the apparatus upon detection of an abnormality of said controller, all of said means being under the control of said micro-computer.

2. A vehicle height adjusting apparatus according to claim 1, wherein said self-diagnosing means includes a controller abnormality detecting means which is supplied with a normal operation pulse signal produced by said micro-computer in the normal state and generates an abnormality alarming signal upon interruption of the supply of said normal operation pulse signal.

3. A vehicle height adjusting apparatus according to claim 1, wherein said compressor driving means includes relay means for energizing or deenergizing said compressor.

4. A vehicle height adjusting apparatus according to claim 1, further including exhaust means for decreasing pressure of said suspension.

5. A vehicle height adjusting apparatus according to claim 4, wherein said controller further comprises exhaust drive means which includes relay means for energizing or deenergizing said exhaust means.

6. A vehicle height adjusting apparatus according to claim 1, further including a monitor lamp connected to said compressor drive means, said lamp being lit in dependence on the output signal of said compressor drive means.

* * * * *